Oct. 20, 1936.  H. W. PRICE ET AL  2,057,740
CLUTCH CONTROL MECHANISM
Filed Nov. 27, 1931
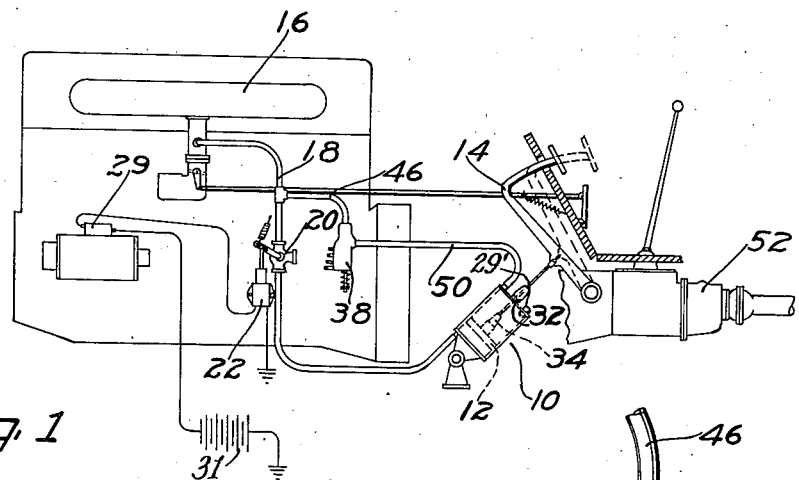
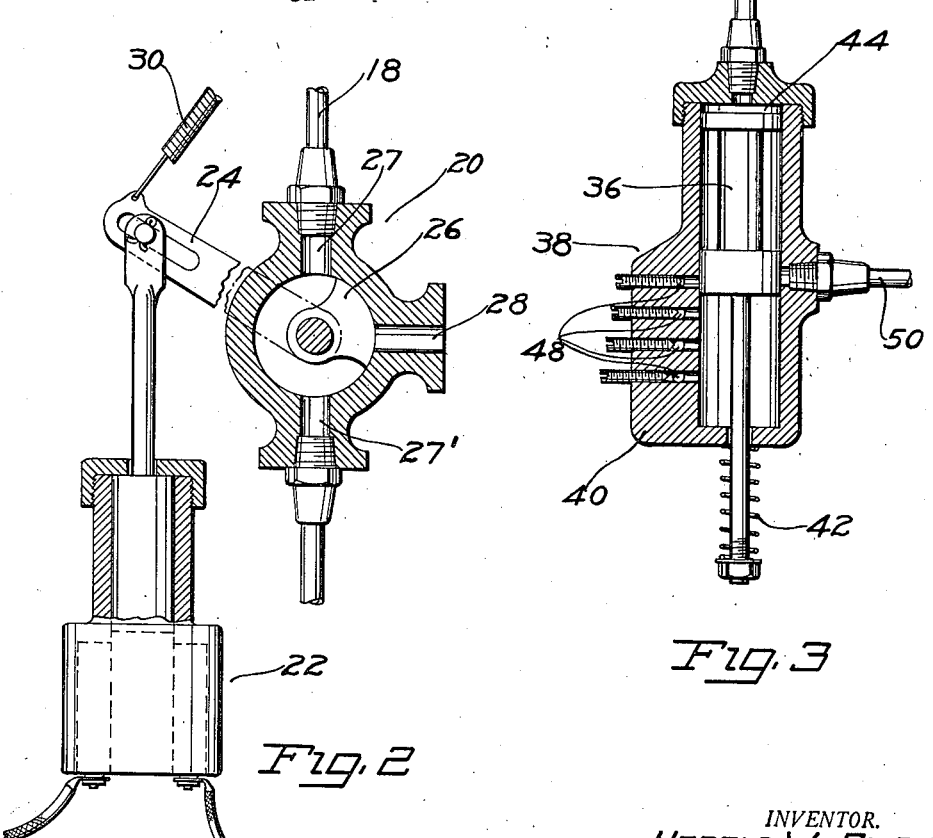
INVENTOR.
HAROLD W. PRICE
EARL R. PRICE
BY
ATTORNEY Patented Oct. 20, 1936

2,057,740

UNITED STATES PATENT OFFICE 2,057,740

CLUTCH CONTROL MECHANISM

Harold W. Price and Earl R. Price, South Bend, Ind., assignors to Bendix Aviation Corporation, South Bend, Ind., a corporation of Delaware Application November 27, 1931, Serial No. 577,658

3 Claims. (Cl. 192—.01)

This invention relates in general to the power transmission structure of an automotive vehicle and in particular to means for automatically declutching or disconnecting the internal combustion engine from the drive shaft. Such devices are now well-known in the trade as "free wheeling" mechanisms and serve to permit the vehicle to coast under its own momentum upon release of the accelerator pedal or otherwise retarding the speed of the engine.

It is the principal object of the invention to provide two separate and distinct free wheeling mechanisms so cooperating as to insure a completely effective structure for this purpose.

It is a further object to incorporate in a vehicle, provided with a conventional drive shaft or mechanical free wheeling device as standard equipment, a vacuum operated declutching device operative with the vehicle parked.

To this end there is provided a vacuum operated mechanism, particularly effective to automatically disengage the standard clutch of the vehicle when and if the engine is idling and the vehicle is at a stand still, and to combine with such a mechanism a free wheeling unit of the conventional mechanical type incorporated in the drive shaft of the vehicle.

A further object of the invention is to provide a vacuum operated clutch controlling mechanism comprising a fluid motor, the control valve of which is operated electrically by a solenoid, the energizing and deenergizing of the solenoid and the consequent mode of operation of the valve being a function of the R. P. M. of the engine crank shaft.

Other objects of the invention and desirable details of construction and combinations of parts will become apparent from the following description of a preferred embodiment, which description is taken in conjunction with the accompanying drawing, in which:

Figure 1 is a diagrammatic view of the combined vacuum and mechanical free wheeling units incorporated in the power transmission between the engine and the drive shaft;

Figure 2 is a sectional view through the three-way control valve and its operating solenoid; and Figure 3 is a sectional view through the bleeder valve for controlling the mode of engagement of the clutch.

In that embodiment of the invention illustrated diagrammatically in Figure 1 there is provided a vacuum operated clutch operating mechanism automatically operative, at or below a predetermined R. P. M. of the engine crank shaft, to disengage the clutch and likewise automatically operative, above said predetermined R. P. M., to engage the clutch. This mechanism comprises a vacuum operated double-ended motor 10, the piston 12 of which is connected to a conventional clutch pedal 14. The motor is connected to an intake manifold 16 of the internal combustion engine of the vehicle by a conduit 18, and a three-way control valve 20 is interposed in the conduit to control the operation of the motor.

At closed throttle a vacuum of approximately twenty inches of mercury is induced in the manifold by the operation of the engine pistons, and this evacuated condition serves to effect the evacuation of the cylinder of the motor to energize the latter and move the clutch pedal to its disengaging position, as shown in dotted lines in Figure 1.

The three-way control valve device 20, which serves to alternately place the motor in communication with the manifold and atmosphere, is disclosed in detail in Figure 2, and briefly comprises a solenoid 22 operative to actuate a crank 24, the latter serving to rotate a recessed valve member 26. The rotatable valve part 26 controls ports 27, 27' and 28 in the valve body providing communication, respectively, with the source of vacuum, the clutch operating motor and the atmosphere.

According to an important feature of the invention, the solenoid is energized to close port 27 in the valve and permit engagement of the clutch with operation of a connection or contact made in a generator cut-out 29; thus when the R. P. M. of the engine crank shaft is reduced to a predetermined minimum factor, preferably at the idling speed of the engine, the generator voltage is correspondingly reduced thus automatically operating the generator cut-out and the aforementioned contact to open the solenoid circuit and permit a solenoid spring 30 to open the valve and disengage the clutch. An inwardly opening check valve 29' is provided in the upper end of the motor 10 to permit the piston 12 to move downwardly to effect this operation. It is, of course, understood that the generator is geared directly to the crank shaft of the engine in the conventional manner.

When the R. P. M. of the engine is increased sufficiently to step up the voltage beyond the predetermined critical factor, the solenoid circuit is closed to thereby energize the solenoid with a minimum of current derived from a battery 31. The valve 20 is accordingly opened to vent the motor via atmospheric port 28. The driving clutch plate is thus permitted, under the action of the conventional clutch spring, to reengage the driven plate to complete the engagement of the clutch.

The rate of movement of the driving clutch plate, not shown, is determined both by the position of the piston 12 within the motor and by the degree of manifold vacuum. The piston moves rapidly during the first part of the clutch plate movement by virtue of the rapid escape of air through a relatively large opening in a hub 32 of the motor; however, after a tapered portion 34 of the piston rod enters the aforementioned opening the rate of efflux of air is appreciably decreased, and thereafter the rate of air efflux from the double-ended motor is controlled by the position of a spool-shaped piston 36 in a bleeder valve 38. This valve, which is detailed in Figure 3, comprises a casing 40 housing the aforementioned piston, the latter being moved upwardly, to compress spring 42, by virtue of the evacuation of a chamber 44 in the casing. A conduit 46 provides an unimpeded connection interconnecting the chamber 44 with the manifold via the conduit 18.

With acceleration of the engine there is effected a progressive decrease in the manifold vacuum, thus permitting the spring 42 to move the piston downwardly and uncover one or more of a plurality of set screw adjustable air bleed openings 48. The openings 48 control the air forced from the motor and passing through a conduit 50. The rate of clutch plate movement is, therefore, a function of the rate of efflux of air from the compression side of the double-ended motor, said rate being a function of the manifold vacuum. There is thus provided two stages of clutch plate movement, the latter stage being quite rapid at wide open throttle, which is the end desired.

The aforementioned means for controlling the rate of clutch plate movement is not claimed herein, inasmuch as this structure forms the subject matter of our copending application No. 577,659, filed concurrently with the instant application.

Passing now to the most important phase of the invention, it will be noted that the control valve 20 is automatically opened to deenergize the motor and effect an engagement of the clutch when and if the R. P. M. of the engine exceeds a predetermined minimum. There is thus provided an automatic disengagement of the clutch when the engine is idling and the car is at a standstill. With the car in motion this minimum R. P. M. is exceeded, thereby rendering the vacuum operated clutch controlling device inoperative. However, such a mechanism as cited above is well adapted for joint use with any one of the conventional one-way clutch devices now extensively used in the trade to provide the free wheeling or coasting effect; for with such devices manual operation of the clutch pedal is necessary in starting the vehicle from rest.

It is accordingly suggested that the aforementioned clutch controlling unit be combined with a conventional free wheeling unit 52, Figure 1, the latter being preferably incorporated in the rear end of the transmission case and just ahead of the forward end of the drive shaft.

Briefly reviewing the complete operation of the mechanism, when the engine is started the clutch is automatically disengaged by the vacuum operated motor and subsequently permitted to automatically engage when the motor is speeded up to engage the vehicle in low gear. Thereafter, the vacuum device of itself would prove inefficient in disengaging the clutch because of the delay necessary to reduce the R. P. M. of the engine sufficiently to operate the vacuum mechanism; however, declutching and clutching of the engine and drive shaft is then had by virtue of the automatic operation of the one-way clutch mechanism 52. As is well-known, this operation is effected when the R. P. M. of the driven element of the one-way clutch exceeds the R. P. M. of the driving element.

There is thus provided a mechanism insuring free wheeling with the vehicle in motion, and also providing for automatic operation of the clutch with the vehicle at rest. Manual operation of the clutch is thus entirely dispensed with.

While one illustrative embodiment has been described, it is not my intention to limit the scope of the invention to that particular embodiment, or otherwise than by the terms of the appended claims.

We claim:

1. In an automotive vehicle provided with an integral combustion engine having an intake manifold, a clutch, a transmission and a drive shaft, a one-way clutch interposed between the drive shaft and the transmission, said latter clutch comprising driving and driven elements connected respectively to the engine and shaft and operative to disengage the engine from the shaft when the R. P. M. of the driven element exceeds that of the driving element, a pressure differential operated power mechanism operative to automatically disengage the first mentioned clutch when the R. P. M. of the engine is below a predetermined factor and further operative to automatically permit an engagement of the first mentioned clutch when and if the R. P. M. of the engine exceeds a predetermined factor, said power mechanism including means operative to regulate the engagement of the clutch in accordance with the degree of absolute pressure within said manifold.

2. In an automotive vehicle provided with an internal combustion engine and a clutch, said engine having an intake manifold, a manifold vacuum operated actuator operably connected with said clutch, fluid transmitting connections interconnecting said actuator and manifold, a control valve for said actuator interposed in said connections, means for operating said valve, said means being operable in accordance with the R. P. M. of the internal combustion engine, and other valve means also interposed in said connections, operable in accordance with the degree of vacuum in the manifold, and operative to control the clutch engaging operation of said actuator.

3. In an automotive vehicle provided with an internal combustion engine and a clutch, said engine being provided with an intake manifold, a double-ended manifold vacuum operated motor operably connected with said clutch, a fluid transmitting connection interconnecting one end of said motor and said manifold, three-way control valve means interposed in said connection, other control valve means for said motor, a fluid transmitting connection interconnecting said latter valve means and the aforementioned fluid transmitting connection, the junction of said connection lying between the manifold and the first mentioned control valve means, and other fluid transmitting connections interconnecting the second mentioned valve means and the other end of said motor.

HAROLD W. PRICE.
EARL R. PRICE.

CERTIFICATE OF CORRECTION.

Patent No. 2,057,740.

October 20, 1936.

HAROLD W. PRICE, ET AL

It is hereby certified that error appears in the printed specification of the above numbered patent requiring correction as follows: Page 2, second column, line 19, claim 1, for "integral" read internal; and that the said Letters Patent should be read with this correction therein that the same may conform to the record of the case in the Patent Office.

Signed and sealed this 21st day of September, A. D. 1937.

Henry Van Arsdale (Seal)

Acting Commissioner of Patents.